INVENTOR.
DOMER SCARAMUCCI

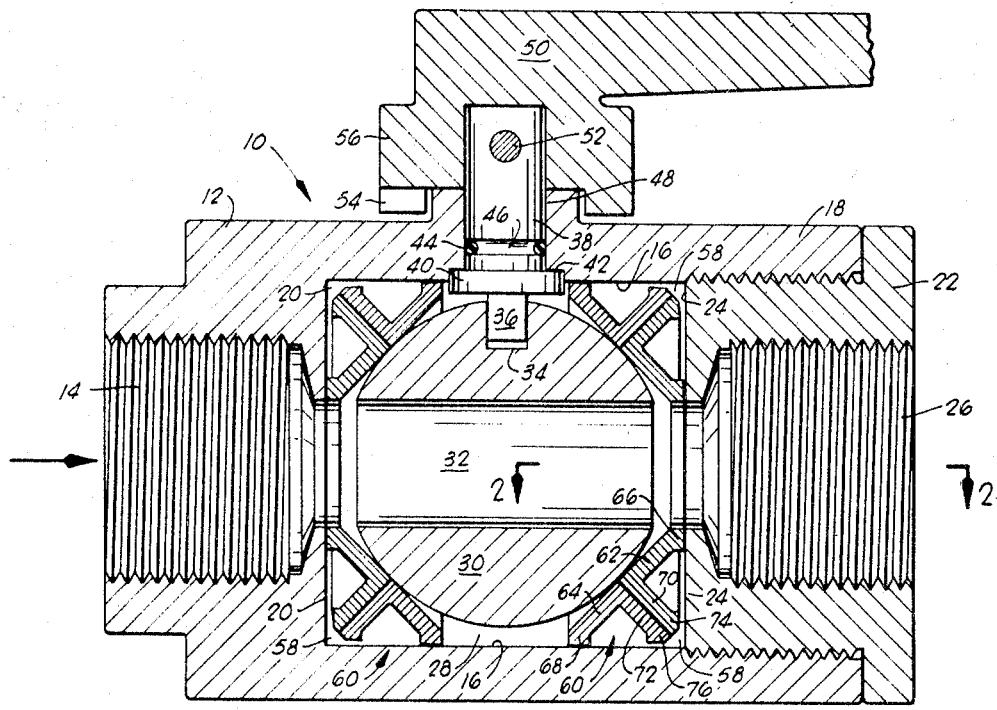
Fig. 1
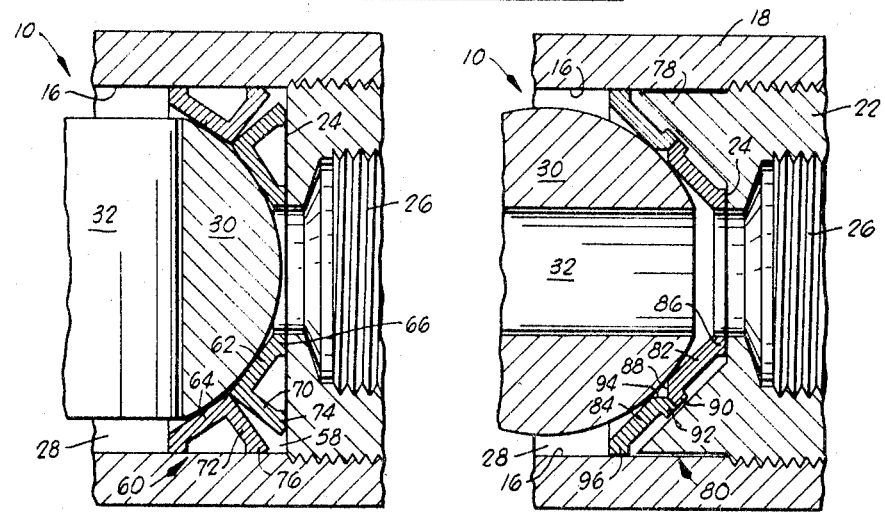
Fig. 2  Fig. 3
INVENTOR.
DOMER SCARAMUCCI
BY
ATTORNEYS

United States Patent Office 3,460,803
Patented Aug. 12, 1969

3,460,803
HIGH TEMPERATURE AND PRESSURE VALVE SEAT
Domer Scaramucci, Oklahoma City, Okla., assignor to Balon Corporation, Oklahoma City, Okla., a corporation of Oklahoma
Filed Oct. 17, 1966, Ser. No. 587,304
Int. Cl. F16k 5/06, 27/06
U.S. Cl. 251—175                       21 Claims

ABSTRACT OF THE DISCLOSURE

A ball valve having upstream and downstream seats formed of two rings. One ring of each seat has a length greater than its thickness and is supported to extend along a tangent to the outer surface of the ball, such that it will twist to follow, yet support the ball, particularly at the downstream end of the valve. The second ring of each seat may be similarly constructed, or may be of a more elastic material to enhance the seal provided by the seat.

---

This invention relates generally to improvements in ball valves and, more particularly, but not by way of limitation, to an improved valve seat which is particularly suited for use in ball-type valves at conditions of high temperature and/or pressure. Related subject matter is disclosed and claimed in an application entitled "Dual Ring Valve Seal," Ser. No. 587,125 filed by applicant on even date herewith, now Patent No. 3,401,916.

As it is well known in the art, many types of ball valves are constructed in such a manner that they utilize a "floating ball" type of valve control. Such ball valves employ several types of valve seats of varying density and flexural characteristics for the purpose of sealingly engaging the valve ball to thereby prevent fluid flow when the valve is closed. Various difficulties are encountered with the use of such sealing rings, especially in valving applications wherein fluids must be controlled at higher pressure and/or temperatures. At higher pressures, it is often the case that a valve seat or sealing ring having the required rigidity or load bearing property will provide poor sealing, while sealing rings selected for their fluid sealing properties will not adequately support the valve ball at increasing upstream pressures.

In its broader aspects, the present invention contemplates a dual ring valve seat wherein respective coactive sealing rings are formed from selected materials which will impart maximum sealing and load bearing qualities to the valve seat through flexural reconfiguration of the individual sealing rings. More particularly, the valve seat consists of a pair of rings which coact in a predetermined manner and which are unitarily braced within a valve chamber to form both a valve seat and a seal between an annular area about a valve ball and an annular end portion of the valve chamber. It is preferred that each of the rings of the dual ring assembly be formed of materials having different moduli of elasticity such that one ring can function as a seal while the primary function of the other ring is that of a load bearing element. Further, through utilization of a floating ball assembly, closure of the ball valve will result in endwise movement of the valve ball under urging of the upstream pressure to further bear upon the downstream valve seat or unitary dual ring seal to bring about still further flexural reconfiguration, thus enhancing the strength of the seal.

Therefore, it is an object of the present invention to provide a high pressure valve seat which can be easily molded and which will require minimum machining in production.

It is also an object of the invention to provide a valve seat which efficiently and effectively performs the dual function of supporting a valve member in a desired position while providing a fluid-tight seal with the valve member under excessively high pressure and/or temperature conditions.

It is another object of the present invention to provide a dual ring valve seat for high pressure and/or temperature applications wherein the selection of materials for forming the rings will enable varying degrees of sealing and load bearing capability to be imparted to the valve seat assembly.

Finally, it is an object of the present invention to provide a dual ring valve seat for use as a seal in high pressure and temperature applications wherein the shape and flexural reconfiguration of the bearing rings tends to reduce damaging wear which may occur through continuous use and repeated closures of the valve assembly.

Other objects and advantages of the invention will be evident from the following detailed description when read in conjunction with the accompanying drawings which illustrate the invention.

In the drawings:

FIG. 1 is a vertical sectional view through a ball valve which is constructed in accordance with the invention.

FIG. 2 is a partial sectional view taken substantially along lines 2—2 of FIG. 1.

FIG. 3 is a partial sectional view which shows an alternative form of valve seat.

Figure 4:
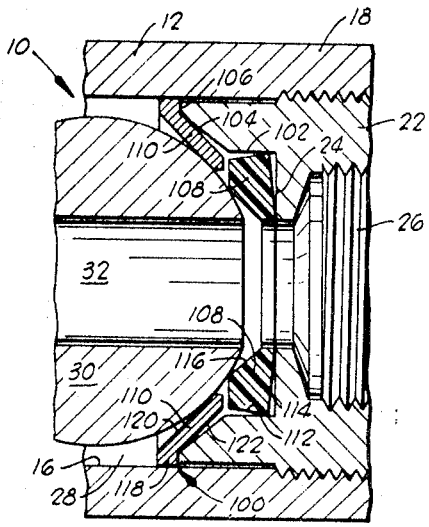
FIG. 4 is a partial sectional view of a ball valve similar to the FIG. 1 valve which includes another form of valve seat and valve chamber configuration.

Referring in the drawings in detail, and particularly FIG. 1, reference character 10 generally designates a ball valve constructed in accordance with this invention. The valve 10 includes a valve body 12 having a threaded inlet 14 in one end thereof and a larger counterbore 16 extending from the opposite end 18 thereof to provide a shoulder or annular wall 20 at the intersection of the inlet 14 and counterbore 16 which extends substantially normal to the axis of the inlet 14. A threaded end connector 22 is secured in the end 18 of the valve body 12 and has a flat inner end 24 forming a shoulder or annular wall which also extends substantially normal to the axis of the inlet 14. A threaded outlet 26 is formed through the center of the connector 22 in alignment with the inlet 14, such that the valve 10 may be secured in a fluid circuit. It will also be understood that rather than having the inlet 14 and outlet 26 threaded for connection with adjacent sections of a pipeline, the valve 10 could be secured in the fluid circuit by other mechanisms, such as flanges or uniontype connectors.

The counterbore 16, between the end walls 20 and 24, forms a valve chamber 28 for valve ball 30. The ball 30 has the usual port 32 therethrough which is aligned with the inlet 14 and outlet 26 when the valve is in an open position as illustrated in FIG. 1 and which is extended in a direction normal to the axis of the inlet 14 and outlet 26 when the valve is in a closed position as illustrated, for example, in FIG. 2.

As shown in FIG. 1, the ball 30 is provided with a rectangular slot 34 in the top thereof to receive the lower end 36 of a valve stem 38 by means of which the ball 30 is turned between its open and closed positions. The end 36 of the valve stem 38 is rectangular in cross section and the slot 34 is elongated, such that the ball 30 may be moved upstream and downstream in the valve chamber 28 when in a closed position, as is normal in "floating ball" valve construction. A circumferential flange 40 is formed around the valve stem 38 immediately above the lower rectangular end 36 to engage a flat surface 42 provided in the top of the valve chamber 28 and prevent the inadvertent removal of the valve stem 38 from the valve body 12 during operation. A sealing ring 44 is disposed in a circumferential groove 46 formed around the valve stem 38 to seal with the walls of the aperture 48 formed in the valve body 12 for receiving the valve stem. A suitable handle 50 is secured on the upper or outer end of the valve stem 38 by a pin or the like 52 for manually turning the valve stem 38 and valve ball 30. A projection 54 is formed on the lower end of the hub 56 of the handle 50 to engage stops (not shown) formed on the valve body 12 and limit the turning movement of the ball 30 to substantially ninety degrees between its open and closed positions as is common in the art.

The walls of the counterbore 16 adjacent opposite ends of the valve chamber 28, and the end walls 20 and 24, form what may be considered sockets 58 for receiving dual ring valve seats generally designated by the reference character 60. As shown in FIG. 1, two of the valve seats 60 are shown, one for each of the upstream and downstream ends of the valve chamber 28, such that the valve 10 may be used in either direction in the fluid circuit. That is, what has been designated as the inlet 14 may actually be connected either as the inlet or the outlet of the valve.

Each valve seat 60 is comprised of a smaller diameter ring 62 and a larger diameter ring 64 which interlock for coactive operation within the socket space 58 of the valve chamber 28. Each of the rings 62 and 64 has a length which is greater than its respective thickness, length being the measure along the axis of the ring, and rings 62 and 64 are formed so that they may be situated in an end-to-end relationship which forms a cone or plane or revolution tangent to the valve ball 30. Each smaller diameter ring 62 is formed to have an annular foot or end portion 66 which is maintained around the inner periphery of the annular wall 20 or 24. Similarly, each larger diameter ring 64 is formed to have a circumferential outer portion 68 which is maintained in firm contact about the cylindrical outer wall or counterbore 16 of valve chamber 28.

Each of the smaller diameter rings 62 and larger diameter rings 64 is formed to have a respective projection member 70 and 72, respectively, extending at right angles from their position of abutment, the tangential contact with valve ball 30. Thus, when the rings 62 and 64 are in their operative position within the valve chamber 28, the projection members 70 and 72 are disposed adjacent one another in full contact. Each of the projection members 70 and 72 may be formed either as a circumferential ring extension or as a series of periodic projections about the ring circumference, this depending upon the particular application and required rigidity. It can be noted too from FIG. 1, that each of the projections 70 and 72 is constructed so that it is slightly spaced away from its respective wall portion of socket space 58. That is, a foot or end portion 74 of projection 70 is slightly spaced from the annular wall 20 or 24 and a foot or end portion 76 of projection 72 is slightly spaced away from the cylindrical wall of counterbore 16. This spacing is utilized to afford flexure or twisting space during operation of the valve seat 60 through valve opening and closing operations as will be further described below.

The selection of materials for formation of the smaller diameter ring 62 and larger ring 64 have appreciable bearing upon the type and effectiveness of seal afforded by the valve seat 60. That is, for its more advantageous usage where higher pressure or temperature is a prime factor, materials may be selected which provide the optimum sealing and valve seating ability, the separate characteristics sometimes being provided by selection of different materials for the rings 62 and 64. Thus, some forms of reinforced plastic, such as nylon or Teflon reinforced with fiberglass, or certain of the metals which have poor resilience or flexural qualities may be selected such that, even through the materials are too stiff to conform to a sufficient extent during assembly and tensioning of the valves, the pressure thrust during usage will tend to realign the valve seats to their maximum sealing and load bearing relationship.

In operation, FIG. 1 shows upstream and downstream valve seats 60 in their slightly stressed condition when the valve 10 is in its valve-open attitude. That is, as each of the pairs of rings 62 and 64 are placed in their coactive alignment and assembled into the valve 10 in contact with valve ball 30, a partial stress or flexure is placed on each of the valve seats 60 which is sufficient to hold the valve ball 30 firmly in place in its operative open position, the inner or seating surfaces of rings 62 and 64 being substantially in alignment and bearing equally in annular contact about the ends of valve ball 30. Upon closure of valve 10, as shown in FIG. 2, the valve ball 30 is allowed to slide downstream under the force of the upstream pressure due to the keyed floating ball connection provided by elongated slot 34 and key 36 (FIG. 1). This upstream pressure will then force the valve ball 30 into the downstream valve seat 60 forcing flexure of rings 62 and 64, the amount of flexure (depending upon the amount of upstream pressure) and the degree of sealing effect being roughly proportional.

As shown in FIG. 2, high pressure behind valve ball 30 forces the smaller diameter ring 62 to a flexure or twist tending to enlarge its outer periphery with both of foot portions 66 and 74 in tight abutment against the annular end wall 24 of socket space 58. Similarly, the greater pressure against valve ball 30 exerts a twisting force upon the larger diameter ring 64 which tends to enlarge its inner periphery thereby forcing the projection 72 outward such that the foot portion 76 is brought into contact with the cylindrical outer wall of socket 58. Thus, depending upon the material selected for formation of the smaller and larger diameter rings 62 and 64 and its attendant flexure qualities, the valve seat 60 can be constructed for use in a wide range of valving pressures and, due to the fact that either one or both of rings 62 and 64 can be constructed from metal material, the valve seat 60 can be especially attractive for use with high temperature fluids.

FIG. 3 shows a modification of valve seat 60 wherein the threaded end connector 22 of valve 10 is designed to show a different interior configuration of valve chamber 28 which effectively does away with the socket spaces 58. Thus, the inner portion of threaded end connector 22 retains a narrow annular wall portion 24 about the outlet 26 but thereafter it extends an inwardly flaring conical projection 78 around the cylindrical outer wall of counterbore 16. A valve seat 80 is then employed to provide the sealing and load bearing function. Valve seat 80 consists of a smaller diameter ring 82 and a larger diameter ring 84 which coact within the valve chamber 28 to support and provide annular sealing engagement about the valve ball 30. The smaller diameter ring 82 has an inner edge or annular foot portion 86 which aligns in sealing engagement with the annular wall 24, and the outer periphery is formed with a bevel 88 and a lip portion 90. The larger diameter ring 84 has an inner lip portion 92 with an inner beveled portion 94, and an outer circumferential foot portion 96 which is brought into sealing engagement with the cylindrical outer wall of counterbore 16.

Thus, in operative alignment, the rings 82 and 84 are disposed in end-to-end relationship and tangentially with respect to the valve ball 30; and upon closure of the valve 10, the lip portions 90 and 92 of respective rings 82 and 84 can be depressed toward or against the conical inner wall of projection 78 while the bevel portions 88 and 94 provide sealing lips in contact about the valve ball 30. Here again, one or the other of the rings 82 and 84 may be formed from material having a lower modulus of elasticity such that a selected one of several flexure variations is effected.

Figure 5:
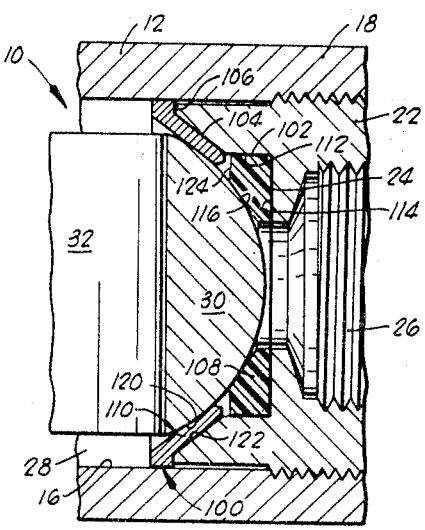
FIG. 5 is an operational view of the FIG. 4 embodiment with the ball valve in a closed position.

Embodiment of FIGS. 4 and 5

FIG. 4 shows a dual ring valve seat of different construction and having a cross section which requires a change in the interior configuration of valve chamber 28. Thus, the threaded end connector 22 is formed to have the annular end wall 24 about its inner periphery adjacent the outlet opening 26; whereupon it projects inward as a first cylindrical wall 102 and an outwardly flared conical wall 104 which is finally terminated by an outer annular wall 106 in junction with the cylindrical outer wall of counterbore 16.

The valve seat 100 also consists of a pair of coacting bearing rings, rings 108 and 110. The smaller diameter ring 108 is formed to have an outer peripheral wall 112 which engages the first cylindrical wall 102 adjacent its outer end and then tapers radially inward toward the inner end of the ring 108, and an outer end wall 114 which is formed to engage the inner periphery of the annular wall 24 while tapering inwardly towards its outer periphery, and a third wall or seating surface 116 which is formed to lie approximately tangentially to the surface of the valve ball 30 when compacted. The larger diameter ring 110 is formed as an angular segment of revolution having a length which is greater than its thickness. The outer periphery of ring 110 being in the form of a circumferential lip portion 118 and an inner seating surface 120 which is in contact with the surface of the valve ball 30, i.e., substantially tangential to the surface of valve ball 30. The relaxed position of large diameter ring 110 is such that an outer surface 122 extends at a slight inward cant from the conical surface 104 to allow an expansion space therebetween.

It has been found desirable that valve seat 100 be constructed with diverse twisting or flexure characteristics. Thus, the outer ring 110 may be formed from certain ones of the metals having a higher modulus of elasticity than another material, such as reinforced plastic, which is employed in the formation of smaller diameter ring 108. Thus, considering both the rigidity of the material and the ring configuration, the inner ring 108 serves to contribute maximum sealing ability while the outer ring 110 contributes mainly load bearing ability while still increasing the overall seal.

In operation of the valve seat 100, the valve seat is still relied upon upon to hold the valve ball 30 in its centered position in the valve-open attitude. Thus, as shown in FIG. 4, the smaller diameter ring 108 and the larger ring 110 are shown as receiving some slight flexure sufficient to maintain the centering of valve ball 30. When valve 10 is fully closed, as shown in FIG. 5, the valve ball 30 is allowed to move in the downstream direction, due to the floating ball connection of elongated slot 34 and key 36 (FIG. 1), to thereby force an increasingly tighter seal against the downstream rings 108 and 110. Thus, the valve ball 30 is forced into the larger diameter ring 110 in sealing contact with the tapered seating surface 120 to cause twisting of the ring 110 such that the inner periphery of ring 110 attempts to expand until the outer wall 122 is brought into contact with the conical surface 104 of threaded connector 22. The larger diameter ring 110, being formed of material having a higher modulus of elasticity, functions primarily as a load bearing ring although some sealing is effected about its seating surface 120.

The valve ball 30 bears with similar force against the smaller diameter ring 108 such that its end wall 114 is forced outward into contact with the annular wall 24, the peripheral wall 112 is compacted against the first cylindrical wall 102, and the tapered seating surface 116 is brought more firmly into contact with the valve ball 30. The smaller diameter ring 108 is preferably formed of a material having a lower modulus of elasticity, it therefore being more resilient, and it serves primarily as a sealing ring although some amount of load bearing must follow necessarily. In any event, the annular sealing lip formed by the outer edge of seating surface 116 and the end wall 124 (see FIG. 5) will provide a most reliable sealing junction.

Figure 6:
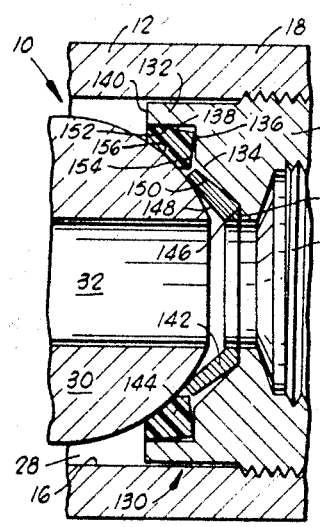
FIG. 6 is a partial sectional view of a ball valve similar to the FIG. 1 valve and including still another form of valve seat and valve chamber configuration.
Figure 7:
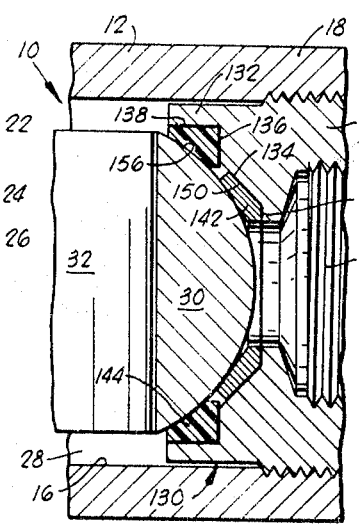
FIG. 7 is an operational view of the FIG. 6 embodiment when the ball valve is in its closed position.

Embodiments of FIGS. 6 and 7

A dual ring valve seat 130 provides still another form of seal-seat unit which is particularly desirable at conditions of high pressure and temperature, valve seat 130 relying upon a still different interior configuration of the valve chamber 28. Thus, the threaded end connector 22 is formed to have an annular wall 24 about the periphery of the outlet opening 26 and a projection 132 extends inwardly in the form of an outwardly flaring conical wall 134 which terminates in a second annular wall 136 extending further outward to a first cylindrical wall 138, annular wall 140 and the counterbore 16 or the cylindrical outer wall of valve chamber 28. The valve seat 130 comprises a pair of bearing rings 142 and 144 which function within the chamber formed by the interior configuration of threaded end connector 22 and the valve ball 30.

The smaller diameter ring 142 is formed with its length greater than its thickness as an angular segment of revolution. An outer end 146 is formed to be placed in sealing contact with the annular wall 24, while a tapered seating surface 148 extends tangentially to and in contact with the valve ball 30. An outer ring wall 150 is formed to taper inwardly away from the conical surface 134 of end connector 22 to form an expansion space therebetween.

The larger diameter ring 144, generally triangular in cross section, has an outer peripheral wall 152 which engages the cylindrical wall 138 adjacent the inner end of the larger diameter ring 144 and then tapers radially inward toward the outer end of ring 144. An outer end wall 154 is formed so that it contacts the second annular wall 136 at its outer extremities but tapers inwardly, and a tapered seating surface 156 provides a wall which is formed generally tangential to and contacting an annular area about the valve ball 30.

In this case, it may be preferable to form the larger diameter ring 144 out of a substance having a lower modulus of elasticity than the material employed in forming the inner ring 142. The combination of load bearing and sealing qualities will provide a most efficient seal under conditions of excessively high temperature and/or pressure.

In the operation of valve seat 130, the valve seat is installed in the upstream and downstream locations within valve chamber 28 and a small amount of flexure is placed upon the coacting rings 142 and 144 during valve assembly. Thus, in the valve-open attitude as shown in FIG. 6, there is sufficient stress placed upon the upstream and downstream valve seats 130 to maintain the valve ball 30 in its centered position. Closure of the valve 10 via rotation of valve ball 30 (FIG. 7) results in the downstream shift of valve ball 30 against the valve seat 130 to greatly increase the various twisting and flexing tensions thereon. The smaller diameter ring 142, the primary load bearing unit, is twisted such that its outer periphery is enlarged and the outer end wall 150 is brought into contact with the conical wall 134 of end connector 22. Some sealing is effected at the annular area about valve ball 30 where it is contacted by the smaller diameter ring 142. At the same time, the larger diameter ring 144, formed of more resilient material, is greatly compacted into the cavity formed by annular wall 136 and first cylindrical wall 138 to thereby greatly increase the bearing pressure of the curved, seating surface 156 against the valve ball 30. This circumferential contact about the valve ball 30 provides the primary sealing contact although some load bearing capability or centering influence is bound to be present.

Figure 8:
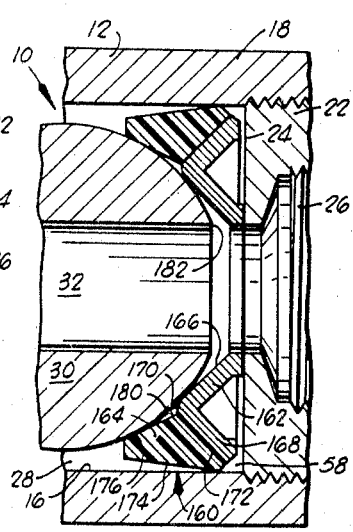
FIG. 8 is a partial sectional view of a ball valve similar to that of FIG. 1 which illustrates yet another form of dual ring valve seat.

Embodiment of FIG. 8

A dual ring valve seat 160 is formed in such a manner that not only are the high pressure and temperature sealing and load bearing characteristics enhanced, but the ring configuration is such that the valve ball "nose" interference is greatly minimized to prevent excessive wear of the seal members. The valve seat 160 consists of an inner or smaller diameter ring 162 and a larger diameter ring 164 which is formed in generally triangular cross section. The smaller diameter ring 162 is formed similar to ring 62 of FIG. 1 to have a tangentially oriented seating surface 166 and a projection 168 which extends generally into the socket space 58, but which is maintained spaced from actual contact. Ring 162 is similar with the exception that a short beveled portion 170 is provided across the knee or inner edge of ring 162. The ring 162 may preferably be formed of material having a higher modulus of elasticity such that it performs primarily a load bearing function although some sealing will be effected necessarily.

The larger diameter bearing ring 164 is a solid ring formed of a softer, more resilient substance, e.g., Teflon, nylon, etc. Ring 164 consists of an inner diagonal wall 172 for seating adjacent to projection 168 of smaller diameter ring 162, an outer peripheral wall 174 which is in contact with the cylindrical outer wall of socket 58 at its outer end and tapers inwardly towards the valve ball 30, and a third, generally tangential seating surface 176 which is maintained in contact with the valve ball 30. It should be noted here that in the semiflexed condition of valve seat 160, the valve-open attitude, the seating surface 176 comes in contact with the projection 168 of ring 162 in such a manner as to define a small space 180 between the bevel portion 170 and the surface of valve ball 30. This configuration is instrumental in alleviating valve seat damage due to valve ball "nose" interference and dragging as will be described.

In the operation of the valve seat 160, slight flexure of both the upstream and downstream valve seats 160 is imposed during the valve-open attitude as shown in FIG. 8. Here again, the function of valve ball support and centering is carried out in the valve-open attitude. During closure of valve ball 30, when the nose 182 of valve ball 30 approaches the sealing edge of smaller diameter ring 162 (the juncture of seating surface 166 and bevel 170), the valve ball 30 will not yet have migrated very far downstream due to the limited shifting of elongated slot 34 along key 36 (FIG. 1) but it will be sufficient to allow the nose portion 182 to pass through the hollow 180 as it rotates towards complete closure. Thus, the valve seat 160 tends to reduce nose wear or dragging of valve ball 30 against the seating surfaces of valve seat 160.

Upon complete closure of the valve ball 30, the smaller diameter ring 162 will be twisted or flexed such that its outer diameter tends toward increasing the diagonal projection 168 being brought back in contact with the annular wall 24. The larger diameter ring 164 tends to twist radially outwardly such that the outer peripheral wall 174 comes into contact with the outer cylindrical wall of counterbore 16 and it tends to wedge into the socket space 58 about the projection 168. Thus, both sealing and the load-bearing characteristics are afforded by the dual rings and these can be varied relative to one another by selection of materials and various balances of elastic characteristics.

From the foregoing it will be apparent that the present invention provides novel valve seat members for use in ball valves for the purpose of providing improved control of fluid flow through valves which are employed in the control of fluids under high pressure and/or temperature. The operating characteristics of the valves can be varied over a wide range by merely changing the materials from which the dual rings of each valve seat are formed. Thus, the properties of elasticity which are attributable to a given material will have a direct bearing upon its function when employed in forming valve seats in accordance with the invention. It is especially desirable from the standpoint of economy and reliability that the valve seat of the present invention requires a minimum of machining in its manufacture.

Changes may be made in the combination and arrangement of parts or elements as heretofore set forth in the specification and shown in the drawings, it being understood that changes may be made in the embodiments disclosed without departing from the spirit and scope of the invention as set forth in the following claims.

What is claimed is:
1. A valve, comprising:
 a body having a valve chamber therein and inlet and outlet openings communicating with the valve chamber;
 a valve ball mounted in valve chamber for movement downstream toward the outlet opening when in a closed position and subjected to a pressure differential; and
 a valve seat in the valve chamber surrounding the outlet opening, comprising:
  a pair of rings engaging the walls of the valve chamber and the outer surface of the valve ball supporting the valve ball in its various positions and providing a seal of the valve ball from the outlet opening, one of said rings having a length greater than the thickness thereof and being extended substantially along a tangent to the valve ball when the valve ball is centered in the valve chamber, said one ring having one end thereof spaced from the adjacent wall of the valve chamber when the valve ball is centered in the valve chamber and the other end in engagement with a wall of the valve chamber, said one ring being flexible about said other end to twist and follow the upstream and downstream movements of the valve ball and maintain a seal against the outer surface of the valve ball.

2. A valve as defined in claim 1 wherein the valve chamber has a wall portion extending substantially normal to the axis of the outlet opening, and said one ring extends from said wall.

3. A valve as defined in claim 1 wherein the valve chamber has a cylindrical wall portion extending concentrically around the outlet opening, and said one ring extends from said cylindrical wall portion generally toward the outlet opening.

4. A valve as defined in claim 1 wherein said one end of said one ring has a projection thereon extending toward the adjacent wall of the valve chamber to limit the twisting of said ring.

5. A valve as defined in claim 1 wherein the second of said rings has a length greater than the thickness thereof and extends in end-to-end relation with said one ring along a tangent to the valve ball when the valve ball is centered in the valve chamber, the end of said second ring remote from said one ring being engaged with a wall of the valve chamber, and said second ring being flexible to twist and follow the upstream and downstream movements of the valve ball.

6. A valve as defined in claim 1 wherein the second of said rings has a lower modulus of elasticity than said one ring and is mounted in the valve chamber to be twisted when the valve ball is forced downstream to maintain sealing engagement with the valve ball in all positions of the valve ball.

7. A valve, comprising:
a body having a valve chamber therein and inlet and outlet openings communicating with the valve chamber, said valve chamber including an annular wall surrounding and extending substantially normal to the axis of the outlet and a cylindrical outer wall projecting from said annular wall;
a valve ball mounted in the valve chamber for movement downstream toward the outlet opening when in a closed position and subjected to a pressure differential; and
a valve seat in the valve chamber surrounding the outlet opening, comprising:
 a smaller diameter ring having a length greater than the thickness thereof extending from said annular wall along substantially a tangent to the valve ball and in engagement with the valve ball when the valve ball is centered in the valve chamber, said smaller diameter ring being flexible to twist in response to downstream movement of the valve ball to follow the valve ball; and
 a larger diameter ring having a length greater than the thickness thereof extending from said cylindrical wall along substantially a tangent to the valve ball and in engagement with the valve ball when the valve ball is centered in the valve chamber, said larger diameter ring being flexible to twist in response to downstream movement of the valve ball to follow the valve ball.

8. A valve as defined in claim 7 wherein the adjacent ends of said rings have circumferential projections thereon extending away from the ball to engage the walls of the valve chamber and limit the twisting of the rings.

9. A valve as defined in claim 8 wherein said circumferential projections are in contact with each other when the valve ball is centered in the valve chamber.

10. A valve, comprising:
a body having a valve chamber therein and inlet and outlet openings communicating with the valve chamber, said valve chamber including an annular wall surrounding and extending substantially normal to the axis of the outlet and a cylindrical outer wall projecting from said annular wall;
a valve ball mounted in the valve chamber for movement downstream toward the outlet opening when in a closed position and subjected to a pressure differential; and
a valve seat in the valve chamber surrounding the outlet, comprising:
 a smaller diameter ring having a length greater than the thickness thereof extending from said annular wall along substantially a tangent to the valve ball and in engagement with the valve ball when the valve ball is centered in the valve chamber, said smaller diameter ring being flexible to twist in response to downstream movement of the valve ball to follow the valve ball, the free end of said smaller diameter ring having a circumferential projection thereon extending substantially normal to said tangent when the valve ball is centered in the valve chamber; and
 a larger diameter ring having an inner end and an outer end, having its outer periphery engaging said cylindrical wall adjacent the outer end thereof and tapered radially inward from said cylindrical wall toward the inner end thereof when said larger diameter ring is in a relaxed condition, said larger diameter ring having a seating surface on the inner end thereof engaging the valve ball when the valve ball is centered in the valve chamber, said larger diameter ring having its inner periphery tapered to mate with said circumferential projection, and said larger diameter ring having a lower modulus of elasticity than said smaller diameter ring to twist when the valve ball moves downstream until the outer periphery of the larger diameter ring is in full engagement with said cylindrical wall.

11. A valve, comprising:
a body having a valve chamber therein and inlet and outlet openings communicating with the valve chamber, said valve chamber having a first annular wall surrounding the outlet and extending substantially normal to the axis of the outlet, a first cylindrical wall projecting from the first annular wall and a second cylindrical wall of larger diameter positioned inwardly in the valve chamber from the first cylindrical wall;
a valve ball mounted in the valve chamber for movement downstream toward the outlet when in a closed position and subjected to a pressure differential; and
a valve seat assembly in the valve chamber surrounding the outlet, comprising:
 a smaller diameter ring having an inner end and an outer end, an outer periphery engaging the first cylindrical wall adjacent the outer end of the ring and tapered radially inward toward the inner end of the ring in the relaxed condition of the ring, a seating surface on the inner end thereof engaging the valve ball when the valve ball is centered in the valve chamber, the outer end of said smaller diameter ring engaging the first annular wall adjacent the inner periphery of the ring and tapering inwardly toward the outer periphery thereof away from the first cylindrical wall in the relaxed condition of the ring, said smaller diameter ring being flexible to be distorted by the valve ball when the valve ball moves downstream until the outer end of the ring fully engages the first annular wall and the outer periphery of the ring fully engages the first cylindrical wall to remain in sealing engagement with the valve ball; and
 a larger diameter ring having a length greater than the thickness thereof, the outer periphery of said larger diameter ring being engaged with the second cylindrical wall and said larger diameter ring extending from the second cylindrical wall substantially along a tangent of the valve ball when the valve ball is centered in the valve chamber, said larger diameter ring having a higher modulus of elasticity than said smaller diameter ring but being sufficiently flexible to be twisted by the valve ball when the valve ball moves downstream to provide support for the valve ball.

12. A valve, comprising:
a body having a valve chamber therein and inlet and outlet openings communicating with the valve chamber, said valve chamber having a first annular wall surrounding the outlet and extending substantially normal to the axis of the outlet, a second annular wall surrounding the outlet positioned inwardly in the valve chamber from the first annular wall and having a larger inner and outer diameter than the first annular wall, and a cylindrical wall projecting from the outer periphery of the second annular wall;
a valve ball mounted in the valve chamber for movement downstream toward the outlet opening when in a closed position and subjected to a pressure differential; and
a valve seat assembly in the valve chamber surrounding the outlet opening, comprising:
 a smaller diameter ring having a length greater than the thickness thereof, the outer end of said smaller diameter ring being anchored to the first annular wall and the smaller diameter ring extending from said outer end away from the adjacent walls of the valve chamber into engagement with the valve ball when the valve ball is centered in the valve chamber, said smaller diameter ring being flexible to be twisted by the valve ball when the valve ball moves downstream; and a larger diameter ring having an inner end and an outer end, the outer periphery of said larger diameter ring engaging said cylindrical wall adjacent the inner end of the ring and tapering radially inward toward the outer end of the ring in the relaxed condition of the ring, a seating surface on the inner end of the larger diameter ring engaging the valve ball when the valve ball is centered in the valve chamber, the outer end of the larger diameter ring engaging said second annular wall near the outer periphery of the ring and tapering inwardly toward the inner periphery of the ring, said larger diameter ring having a lower modulus of elasticity than said smaller diameter ring and distortable by the valve ball when the valve ball moves downstream until the outer end of the ring fully engages said second annular wall and the outer periphery of the ring fully engages said cylindrical wall to remain in sealing engagement with the valve ball.

13. A seat for a valve having a floating valve ball, comprising:

a small diameter ring having a length greater than the thickness thereof, a valve ball seating surface on the inner side thereof which is tapered to be brought into tangential, annular contact with said floating valve ball, said small diameter ring being flexible to twist in response to forces imposed on said seating surface by said floating valve ball such that the outer peripheral portion of said small diameter ring is flexed to an enlarged attitude; and a larger diameter ring having an inner end and an outer end, the inner side of said larger diameter ring being formed as a seating surface which can be brought into tangential, annular contact with said floating valve ball concentric with said inner side seating surface of the small diameter ring, said large diameter ring being flexible to twist in response to forces imposed on said seating surface by said floating valve ball such that the inner end of said large diameter ring is flexed to an enlarged attitude.

14. A seat as defined in claim 13 wherein said inner end of the large diameter ring and said outer peripheral portion of said small diameter ring are aligned in end-to-end relationship such that said respective tangential seating surfaces are aligned in a generally conical projection.

15. A seat as defined in claim 13 wherein said small diameter ring has an outwardly flaring conical projection extending from its outer peripheral portion, the side walls of said conical projection being substantially normal to the tangent to the valve ball.

16. A seat as defined in claim 13 wherein said larger diameter ring has a length greater than the thickness thereof and extends in end-to-end relation with said small diameter ring such that the respective seating surfaces of the large diameter ring and small diameter ring form a substantially continuous conic section.

17. A seat as defined in claim 13 wherein the larger diameter ring has a lower modulus of elasticity than said small diameter ring such that it can be contorted through a greater volume of space to maintain greater sealing engagement with said floating valve ball.

18. A seat as defined in claim 13 wherein said larger diameter ring is formed to be of generally triangular cross-section having an inner wall which is a tapered seating surface contoured to fully contact an annular area around said floating valve ball.

19. A seat as defined in claim 18 wherein said larger diameter ring is formed of a material which has a lower modulus of elasticity than that material which constitutes the smaller diameter ring.

20. A seat for a valve having a floating valve ball, comprising:

a small diameter ring having an inner end and an outer end, an inner side of said small diameter ring being formed as a seating surface which can be brought into contoured, annular contact about said floating valve ball, said small diameter ring being flexible to twist in response to forces imposed on said seating surface by said floating valve ball such that the outer peripheral end of said small diameter ring tends to be flexed to an enlarged attitude; and a large diameter ring having a length greater than the thickness thereof, said ring being tapered along the direction of its longitudinal axis such that the inner surface of said ring forms a seating surface which may be brought into tangential, annular contact about said floating valve ball, said large diameter ring being flexible to twist in response to forces imposed on said seating surface by said floating valve ball such that the inner peripheral portion of said large diameter ring is flexed to an enlarged attitude.

21. A seat as set forth in claim 20 wherein said small diameter ring is formed of a material having a lower modulus of elasticity than that material constituting the large diameter ring.

References Cited

UNITED STATES PATENTS

| | | | |
|---|---|---|---|
| 2,942,840 | 6/1960 | Clade | 251—315 X |
| 3,076,631 | 2/1963 | Grove | 251—315 X |
| 3,174,495 | 3/1965 | Anderson | 251—315 X |
| 3,177,887 | 4/1965 | Priese | 251—315 X |
| 3,184,213 | 5/1965 | Anderson | 251—315 X |
| 3,235,224 | 2/1966 | Grove | 251—315 X |

CLARENCE R. GORDON, Primary Examiner

U.S. Cl. X.R.

251—315